United States Patent [19]

Ramos et al.

[11] 4,266,740
[45] May 12, 1981

[54] STRAP WINDING DEVICE

[75] Inventors: Gary A. Ramos; Michael E. Dell'Ara, both of Willets, Calif.

[73] Assignee: Gerald T. Colwell, Willets, Calif.; a part interest

[21] Appl. No.: 128,935

[22] Filed: Mar. 10, 1980

[51] Int. Cl.³ .................... B65H 17/46; B65H 17/52
[52] U.S. Cl. ................... 242/86.52; 242/86.5 R; 242/106
[58] Field of Search .......... 242/86.52, 85, 86, 86.5 R, 242/86.2, 67.1 R, 76, 106

[56] References Cited

U.S. PATENT DOCUMENTS

| 498,307 | 5/1893 | Rule | 242/86.5 R |
| 2,811,321 | 10/1957 | Barre | 242/86.52 |
| 2,902,233 | 9/1959 | McDonough | 242/85 |
| 3,827,650 | 8/1974 | Stevens | 242/86.5 R |
| 4,007,887 | 2/1977 | Vice | 242/86.5 R |

*Primary Examiner*—Edward J. McCarthy
*Attorney, Agent, or Firm*—Melvin R. Stidham

[57] ABSTRACT

A device for winding up elongated flexible belts comprising a reel of generally square cross-section rotatably mounted on a frame member and extending laterally from one side thereof. A crank extends from the other side and a pair of guide rollers are aligned with the reel parallel to the axis thereof and spaced closely enough to prevent twisting of the belt and to re-orient lengths of the belt which were previously twisted. The frame member is secured onto a mounting bracket so that the crank can be operated from either the right or left hand side.

6 Claims, 4 Drawing Figures

STRAP WINDING DEVICE

BACKGROUND OF THE INVENTION

Elongated straps are commonly used in the trucking industry to secure loads to the truck bed or trailer. A large trailer may be equipped with several of these belts and considerable time is spent by the driver after the trailer is unloaded, winding up the belts to keep them from becoming intermingled and tangled, and to facilitate storage thereof between uses. Some devices for this purpose have been proposed but most are awkward to use and generally require at least partial disassembly in order to enable removal of the coiled belt. Moreover, most known devices still require that the driver separate the belts and lay them out flat and straight before winding them onto a reel.

OBJECTS OF THE INVENTION

It is an object of this invention to provide a device for winding up elongated flexible belts which straightens the belt itself as it winds.

It is the further object of this invention to provide a device for winding up an elongated flexible belt which may be operated with a minimum of preparation time.

It is a further object of this invention to provide a device for winding up an elongated flexible belt which is simple and reliable in operation.

It is a further object of this invention to provide a device for winding an elongated belt which requires a minimum amount of preparation time and which enables quick removal of the coiled belt.

It is further object of this invention to provide a device for winding an elongated flexible belt which may be readily and quickly operated by either a right or left handed person.

Other objects and advantages of this invention will become apparent from the description to follow, particularly when read in conjunction with the accompanying drawing.

SUMMARY OF THE INVENTION

In carrying out this invention, we provide a frame member on which is rotatably carried a reel which is generally square in cross section with a diagonal slot for initially gripping a belt. The reel is turned by a crank extending to the other side of the frame member, and aligned with, and upstream of the reel is a pair of guide rollers which are closely spaced to untwist a belt passing between them. The frame member may be secured on a mounting bracket with the reel disposed in either lateral direction for either right or left hand operation.

BRIEF DESCRIPTIONS OF THE DRAWINGS

In the drawings:

FIG. 1 is a partial view in perspective of the vehicle with the strap rolling device of this invention in place;

FIG. 2 an enlarged view in perspective of the strap rolling device;

DETAILED DESCRIPTION OF A PREFERRED EMBODIMENT

Figure 1:
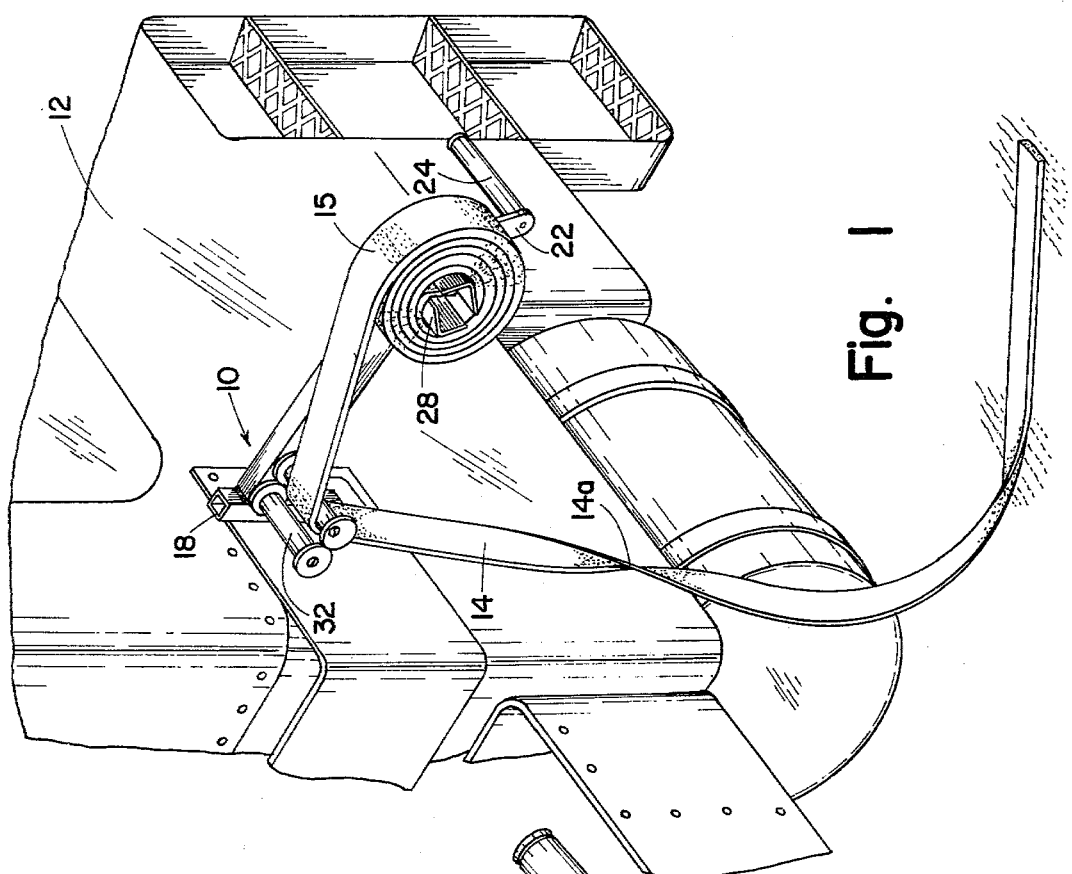

Referring now to the drawings with greater particularity, the belt winding device 10 of this invention is shown mounted on a vehicle 12, such as the cab or trailer of a freight carrying truck. The belt winding device 10 is provided for the purpose of winding load-restraining belts 14 or the like into a compact coil 15 to facilitate storage and transportation when not in use.

Figure 2:
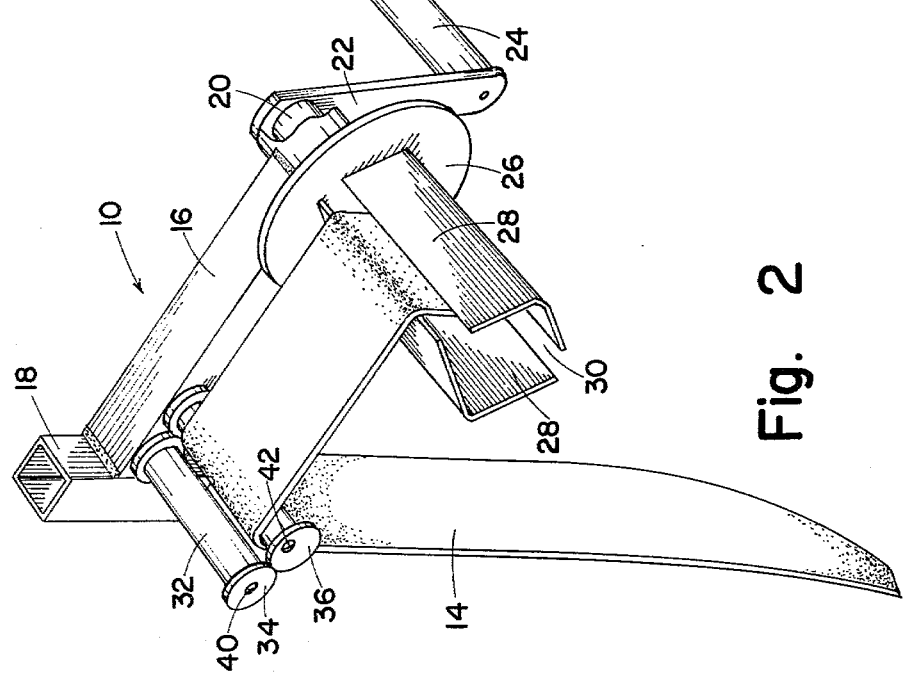

The belt winding device 10 comprises a frame 16, which is welded to, and supported on, a square mounting retainer receptacle 18 and rotatably carries a shaft or spindle 20 at the distal end thereof. Fixed to one end of the spindle 20 is a crank 22 having a rotatable handle 24 of a suitable plastic or the like at the end. Welded or otherwise secured to the other end of the spindle 20 is a disc 26, to the face of which is welded a pair of angle members which, together, form a generally square reel having a space 30 between them in a nature of a slot to receive the leading edge of the belt 14 (FIG. 2) when starting the roll 15.

At the inboard end of the frame 16 is rotatably mounted a pair of rollers 32. The rollers 32 guide the belt 14 onto the reel 28 and, in addition, are spaced closely enough together to restrain the belt against twisting. Hence, as indicated in FIG. 1, twists 14a which may occur in the belt prior to winding are straightened out prior to wrapping onto the coil 15.

The belt 15 is confined to the surfaces of the rollers in a straight path to the reel 28 by end caps 34 and 36 which are secured to the roller cores 38 (FIG. 3) by means of screws 40 and 42. As shown particularly in FIGS. 3 and 4 at least one of the end caps 36 is eccentrically mounted on its screw 42 so that it can be pivoted away to the position shown in FIG. 4 to facilitate placement of the belt 14.

Figure 3:
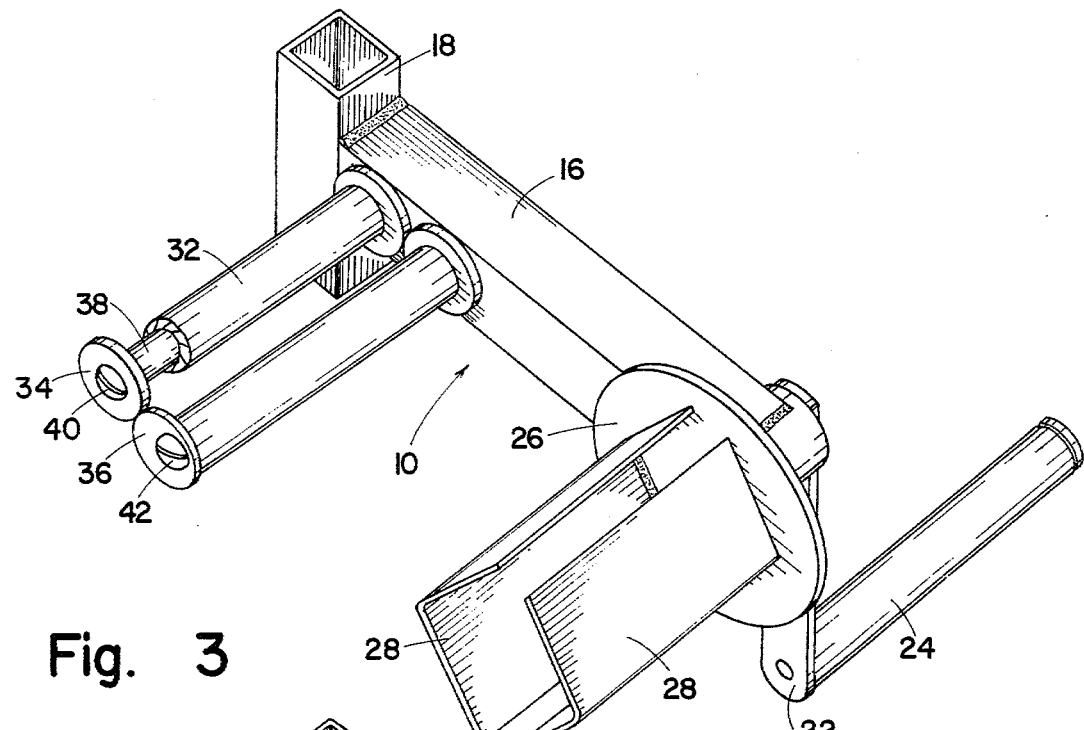
FIG. 3 is an exploded view of the device in perspective.
Figure 4:
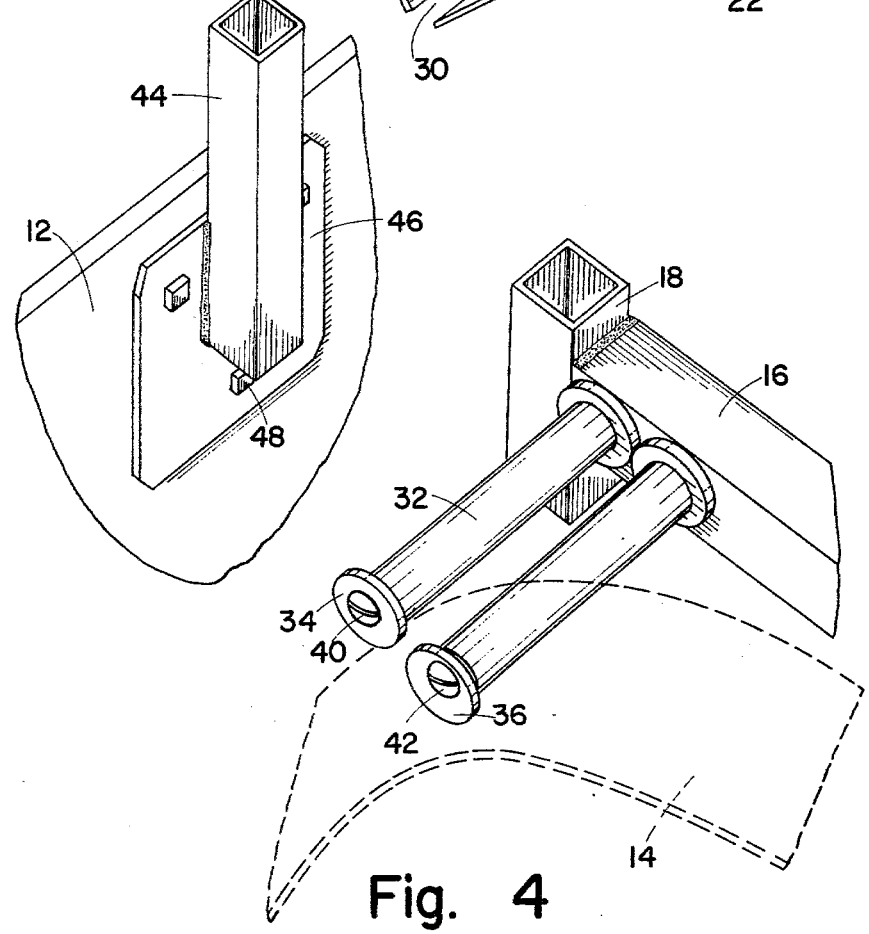
FIG. 4 is a partial view of the device in perspective.

Referring to FIG. 3 in particular, the belt winding device 10 of this invention is mounted on the vehicle 12 by sliding the retainer 18 over a complementary, square pin 44 which is welded to a mounting bracket 46 secured to the vehicle 12, as by means of bolts 48. Because the pin 44 and receiver 18 are of complementary, square cross-sections the winding device 10 can be mounted with the crank handle 24 directed to either the right or left, depending on whether the operator is right handed or left handed. When not in use, the winding device 10 may be stored with the coiled belt 15.

As it is rolled up, the belt 14 tends to form an annular coil of circular outline. Because of the generally square configuration of the reel 28 contact with the rolled belt is essentially limited to the corners. Hence, this minimizes frictional resistance to removal of the coiled belt when fully wound. In addition, the reel 28 could be made to taper inward to a somewhat smaller cross-section at the outer end, again to facilitate belt removal.

While this invention has been described in conjunction with a preferred embodiment thereof, it is obvious that modification and changes may be made by those skilled in the art without departing from the spirit and scope of this invention, as defined by the claims appended hereto.

What is claimed as invention is:

1. A device for coiling elongated flexible belts comprising:
    a frame member;
    a reel rotatably mounted on said frame member; and extending laterally from one side thereof;
    a crank for rotating said reel extending from the other side of said frame member;
    a pair of parallel guide (members) rollers extending laterally from said one side and forming between them a guide slot aligned with and parallel to the axis of said reel;

said guide slot being narrower than the width of a belt to be wound on said reel to prevent twisting thereof, and a member pivotally mounted on the outboard end of one of said rollers and conditioned to be pivoted for selectively clearing and blocking the space between said rollers.

2. The device defined by claim 1 including:

a mounting bracket adapted to be mounted on a vehicle; and a complementary coupling member on said frame member adapted to be mounted on said mounted bracket with said one side facing in either lateral direction.

3. The device defined by claim 1 wherein:

said reel is of generally square cross-section.

4. The device defined by claim 3 including:

a starter slot across said reel to receive the leading end of a belt.

5. The device defined by claim 1 wherein said reel comprises:

a spindle rotatable on said frame member;

a disc fixed to the end of said spindle on said one side;

a pair of slightly spaced angles welded to said disc in face to relationship to extend therefrom.

6. The device defined by claim 1 wherein said last-named member comprises:

a circular disc on the end of said one roller pivotable about an axis eccentric thereto.

* * * * *